(No Model.) 6 Sheets—Sheet 1.
O. B. PECK.
CENTRIFUGAL SEPARATOR.

No. 560,623. Patented May 19, 1896.

Witnesses:
Chas. E. Gaylord
R. H. Garman

Inventor:
Orrin B. Peck

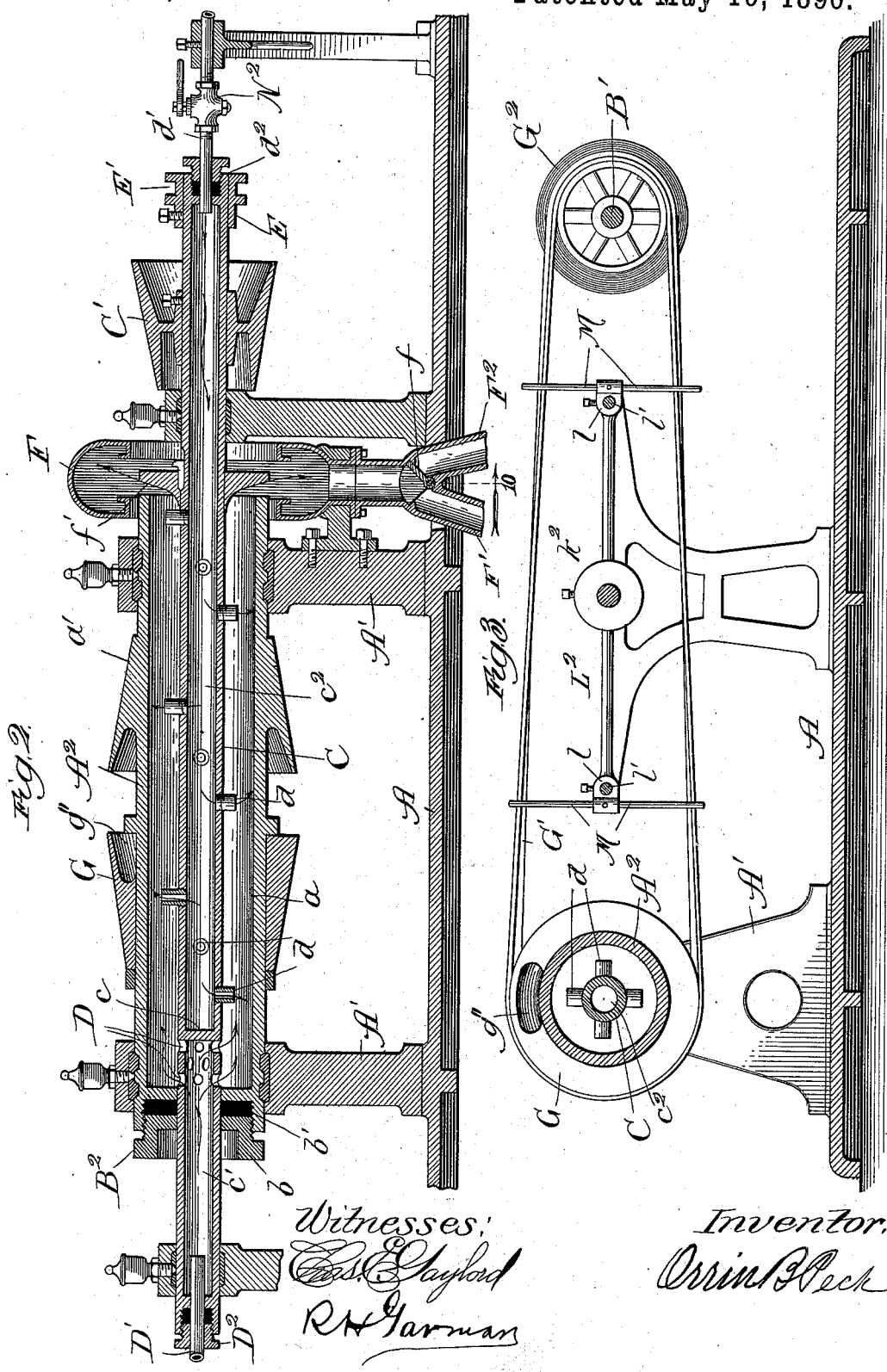

(No Model.) 6 Sheets—Sheet 3.
O. B. PECK.
CENTRIFUGAL SEPARATOR.
No. 560,623. Patented May 19, 1896.
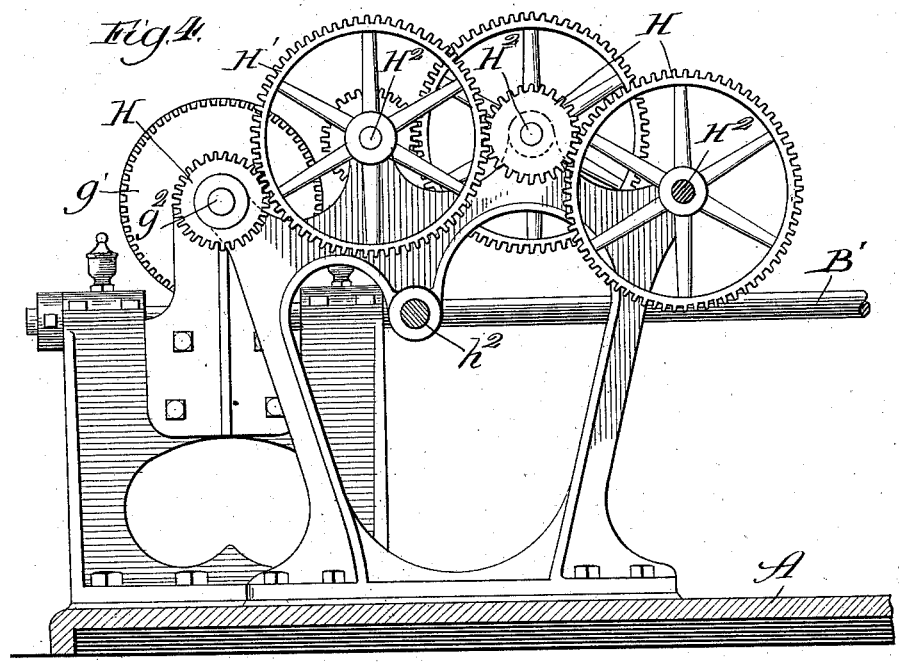
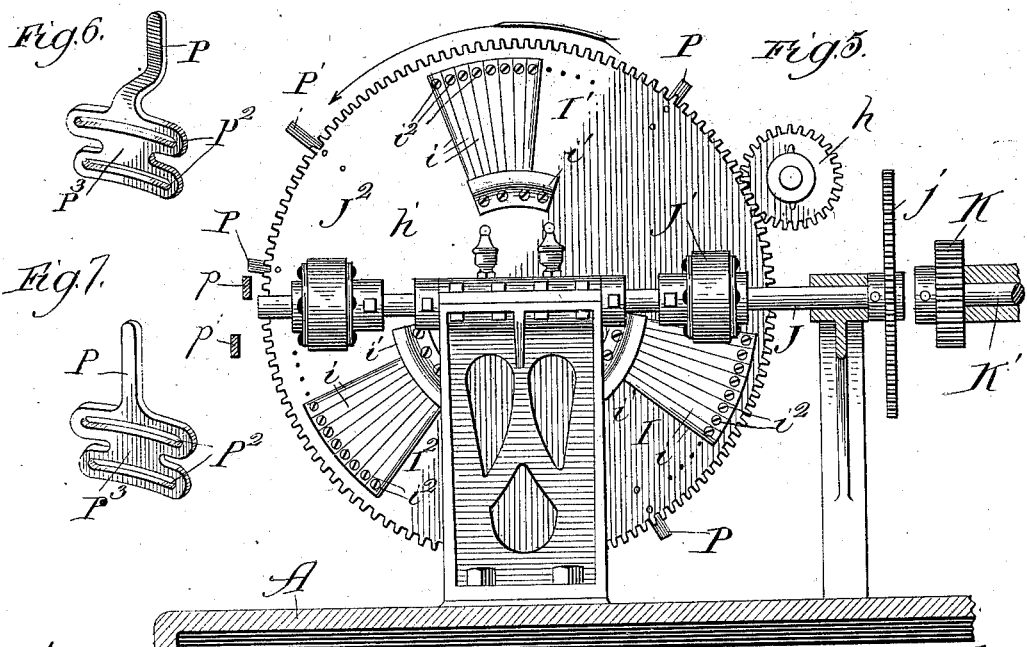
Witnesses:
Inventor:
Orrin B. Peck

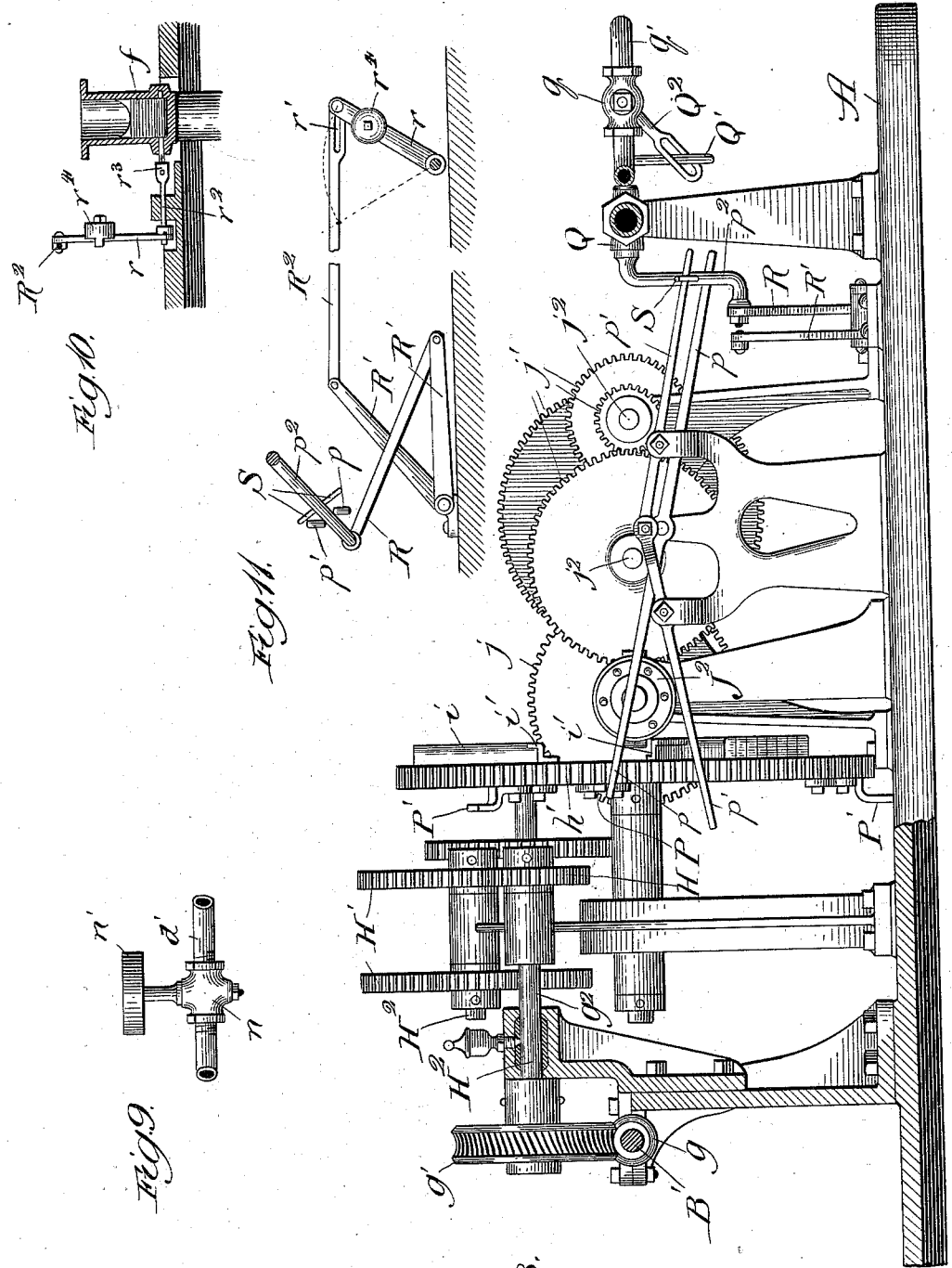

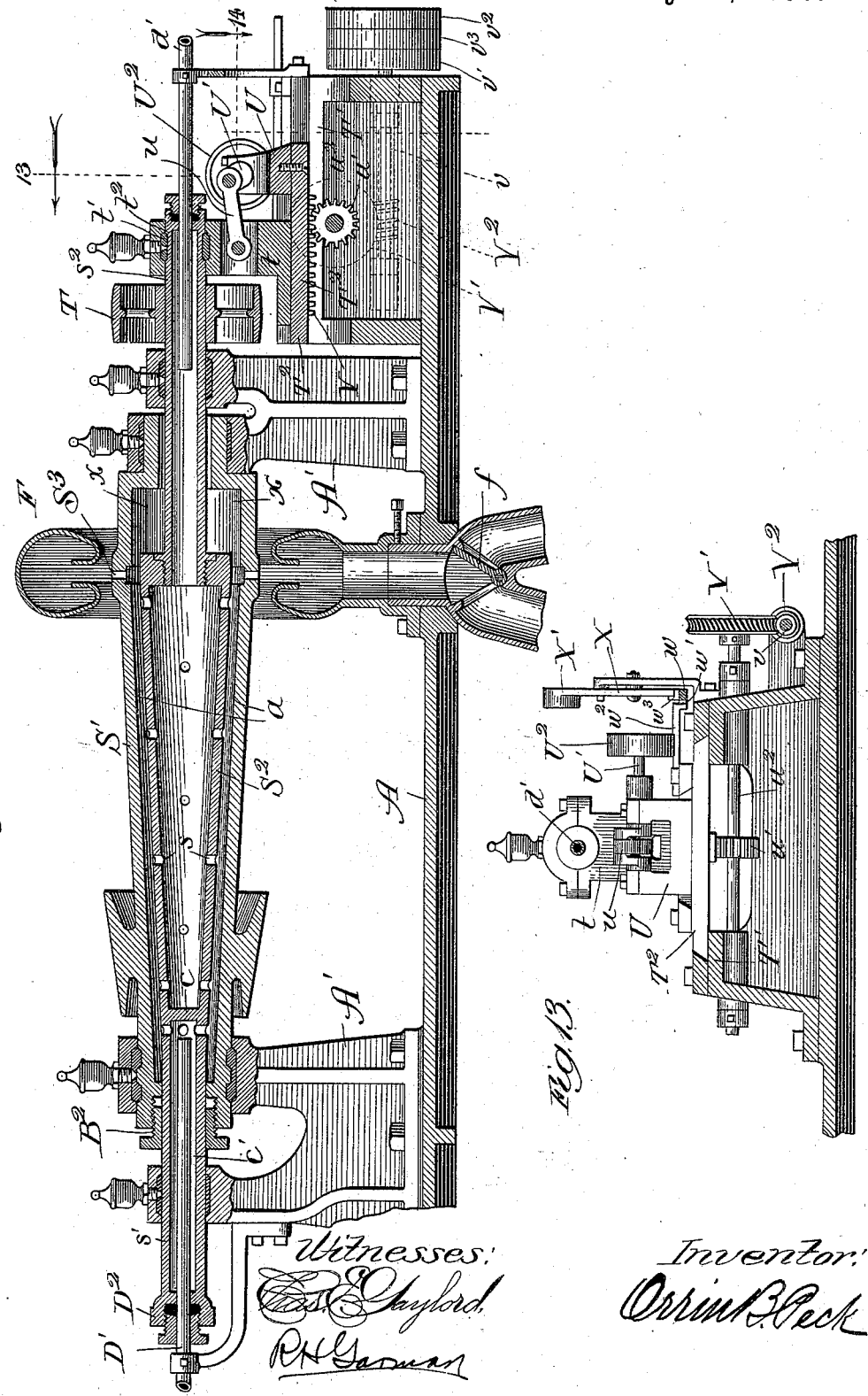

(No Model.) 6 Sheets—Sheet 6.

O. B. PECK.
CENTRIFUGAL SEPARATOR.

No. 560,623. Patented May 19, 1896.

Witnesses:
Chas. L. Gaylord
R H Garman

Inventor:
Orrin B. Peck

UNITED STATES PATENT OFFICE.

ORRIN B. PECK, OF CHICAGO, ILLINOIS, ASSIGNOR TO MELINDA PECK, OF SAME PLACE.

CENTRIFUGAL SEPARATOR.

SPECIFICATION forming part of Letters Patent No. 560,623, dated May 19, 1896.

Application filed March 28, 1894. Serial No. 505,413. (No model.)

*To all whom it may concern:*

Be it known that I, ORRIN B. PECK, a citizen of the United States, residing at Chicago, in the county of Cook and State of Illinois, have invented a new and useful Improvement in Centrifugal Separators, of which the following is a specification.

My invention relates more particularly to improvements in centrifugal ore-separators; and the principal object of my improvement is to provide an apparatus for effecting a more perfect separation of materials of different specific gravities while in a finely-divided state, and their separate discharge by subjecting them while under the action of centrifugal force to aqueous impact and impellent forces. I attain this object by the mechanism illustrated in the accompanying drawings, in which—

Figure 1:
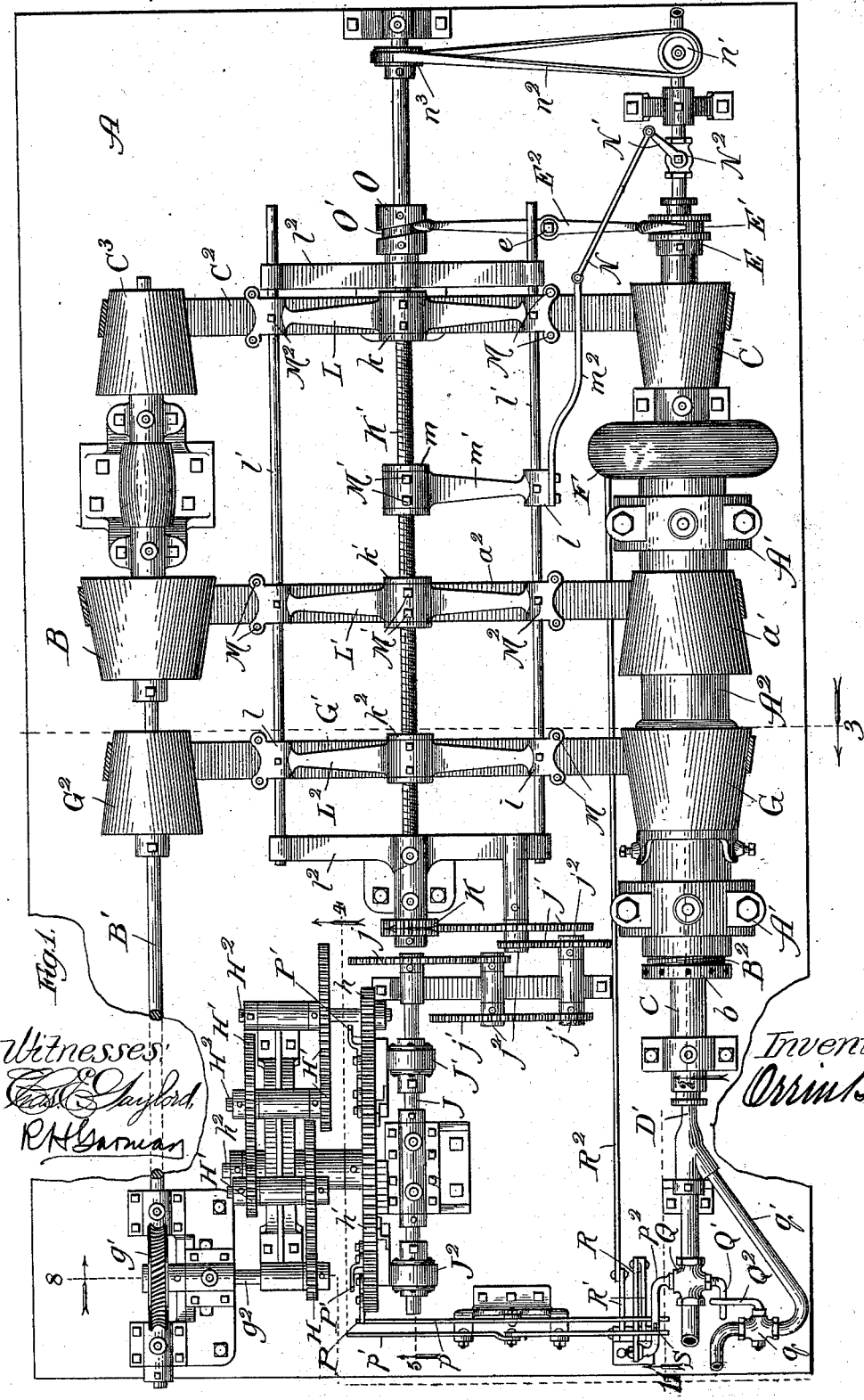
Figure 14:
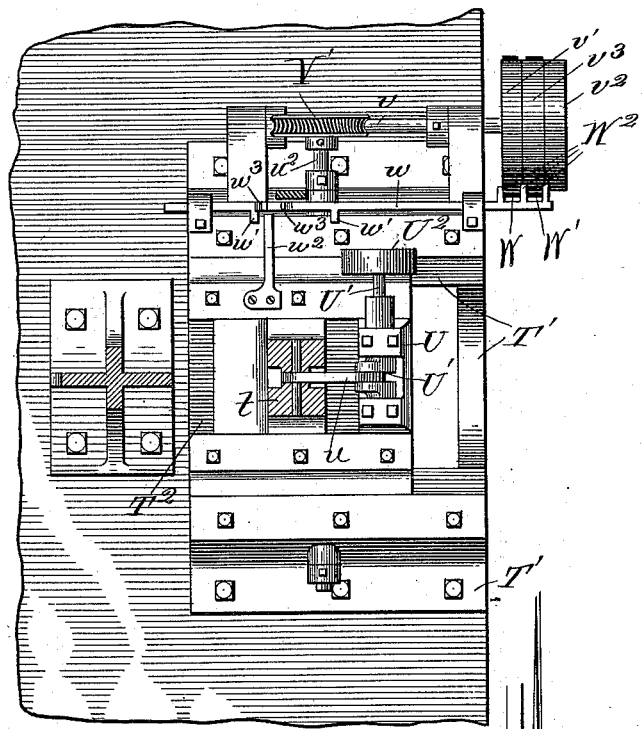
Figure 15:
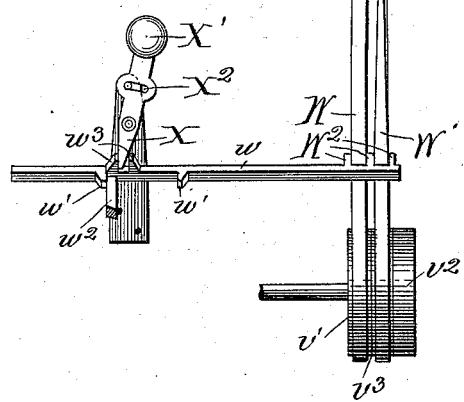

Figure 1 is a top plan view of the entire machine. Fig. 2 is a central vertical longitudinal section through the treatment vessel. Fig. 3 is a transverse section on the line 3 of Fig. 1. Fig. 4 is a longitudinal section on the line 4 of Fig. 1. Fig. 5 is a longitudinal section on the line 5 of Fig. 1. Figs. 6 and 7 are perspective views of the striking-fingers P P'. Fig. 8 is a transverse section on the line 8 of Fig. 1. Fig. 9 is a detail in elevation of the rotary liquid-valve $n$. Fig. 10 is a transverse section on the line 10 of Fig. 2, showing the discharge-valve and its operating-lever. Fig. 11 is a sectional detail on the line 11 of Fig. 1 of the valve-actuating mechanism. Fig. 12 is a central vertical longitudinal section of another form of my improved machine. Fig. 13 is a transverse section on the line 13 of Fig. 12. Fig. 14 is a top plan view of the mechanism for reciprocating the inner impact-shaft. Fig. 15 is a detail in elevation of a part of the belt-shifting mechanism of Fig. 12. All sections are taken in the direction indicated by the arrows.

Similar letters refer to like parts throughout the several views.

A designates a bed-plate, on which is supported by standards A' A', in which it is journaled, the treatment vessel $A^2$, preferably of cylindrical form and provided with an interior separating-surface $a$. This vessel has upon its exterior a conical belt surface or pulley $a'$, by which it is rotated by a belt $a^2$ from the cone-pulley B on the counter-shaft B', preferably journaled in standards on the bed-plate and driven from any suitable source of power.

The treatment vessel or separating-cylinder is preferably closed at the feed end by a stuffing-box $B^2$, through which passes an inner, preferably hollow, impact cylinder or shaft C, which is suitably journaled in standards allowing both rotation and reciprocation and rotated by a cone-pulley C', driven by a belt $C^2$ from the cone-pulley $C^3$ on the counter-shaft at a different rate of speed from the outer cylinder, preferably faster, causing the impact and agitating means carried by said cylinder C to travel circumferentially with respect to the separating-surface. The stuffing-box is provided with a circular threaded gland or plug $b$, which may be screwed in toward the elastic packing $b'$, compressing it, and thus insuring a practically water-tight joint.

The inner cylinder is divided by a partition $c$ into two sections $c'$ and $c^2$. The former is supplied with orifices D, through which mingled ore and a liquid, preferably water, introduced by a pipe D' passing through the stuffing-box $D^2$, similar to $B^2$, is fed to the treatment vessel at or near the head end. Section $c^2$ is preferably provided with orifices along over the separating-surface of the treatment vessel, in which are preferably screwed or otherwise secured hollow projections or tubes $d$, through which are forced jets of a liquid, preferably water, supplied by a pipe $d'$ passing through a stuffing-box $d^2$. These jets are for the purpose of bringing and keeping lighter substances in suspension in the liquid during separation by their impact against the material, also aiding in moving them toward the point of discharge and assisting later, by their increased impact, in dislodging the heavier for removal. The tubes also in their movement through the liquid and suspended material act by their direct contact to mechanically agitate the lighter portion and maintain it in suspension.

At the outer extremity of the inner cylinder beyond the pulley C' is secured a flanged collar E, having a groove or annular way E', formed by said flanges. Into this groove extends the forked end of a lever E², pivoted at e. When the other end of the lever E² is moved back and forth by the means hereinafter described, the inner cylinder is given a movement of longitudinal reciprocation in a direction transverse to the path of rotation of the separating-surface, thus causing the impact-jets to travel longitudinally with relation thereto, bringing practically the whole of such surface under their action. The inner impact-cylinder also serves as a deflector to guide the material along near the separating-surface in the channel or passage, which it forms with the outer vessel.

The treatment vessel discharges into a hood F, which communicates with branch pipes F' and F², conducting the lighter and heavier substances, respectively, to suitable receptacles, the passage from the hood to the pipes being controlled by the valve $f$, which is automatically operated as hereinafter described. Within the hood, keyed to the inner cylinder, is preferably placed a circular plate $f'$, which deflects the material discharged from the treatment vessel into the hood and at the same time by its proximity to the end of said vessel so closes it that sufficient resistance is offered to the discharge of material and liquid to maintain the channel or passage practically full and keep the material on the separating surface in a state of submergence, allowing the suspension of the lighter portion.

On the exterior of the treatment vessel, held between a fixed and movable ring, is mounted the loose cone-pulley G, which is rotated by a belt G' from a pulley G² on the counter-shaft. This pulley G is recessed at its side of largest diameter for a portion of its circumference, as shown at $g''$ in Figs. 2 and 3. This unequal distribution of weight serves to impart in its rotation a vibration to the treatment vessel, assisting in separating lighter and heavier material, and when its speed of rotation is increased, as hereinafter described, also aids in discharging the latter.

To accomplish the separation of material in the treatment vessel and the separate discharge of lighter and heavier substances, the speed of rotation of the treatment vessel, the inner impact-cylinder, and the vibrating pulley, the reciprocation of the inner cylinder, the periods of introduction of material and liquid through pipe D' and of impact liquid through pipe d', and the operation of the discharge-valve are preferably automatically controlled by the mechanism which will now be described. These actions might, however, be otherwise effected—manually, if desired.

On the counter-shaft B' is fixed a worm $g$, engaging a worm-wheel $g'$, mounted on a short shaft $g^2$, journaled in a bracket bolted to one of the counter-shaft standards. This shaft carries at its inner end a gear H, which meshes with one of a series of speed-gears H' on short transverse shafts H², and on the last of these shafts is a small gear $h$, which engages with a large gear $h'$ on a stub-shaft $h^2$, journaled in a standard on the bed-plate. The interposed system of speed-gearing is to vary the relative speeds of rotation of the parts by the interchange and substitution of the gears in the manner well known.

The gear $h'$, which rotates at a comparatively slow rate of speed, carries upon its inner surface three sets I, I', and I² of small movable friction-plates $i$, which are secured to the face of the wheel at their inner ends by flanged brackets $i'$ and at their outer by screws $i^2$, engaging series of holes. By changing the number or position of these plates the surface of frictional contact may be varied both in length and position. On a shaft J, suitably journaled in a position parallel with the face of gear $h'$, are mounted two friction-wheels J' and J², adjustably secured thereon by set-screws and alternately engaging with the friction-plates during the rotation of the gear. On the end of shaft J is a gear $j$, which communicates, through a train of speed-up gears $j'$ on the short longitudinal shaft $j^2$, with a gear K, mounted on the end of the longitudinally-extending threaded rod K'. This rod is supported for rotation in standards, preferably mounted on the base-plate, and carries along its length internally-threaded sleeves $k\ k'\ k^2$, upon which are mounted the transversely-extending belt-shifting bars L L' L², which are supported at their outer ends by sleeves $l$, sliding freely upon the rods $l'$, supported by the cross-bars $l^2$. Upon the ends of bars L L' L² are vertical pins M, engaging the opposite sides of the belts which communicate rotation to the treatment vessel, the inner impact-cylinder, and the vibrating pulley.

As the gear $h'$ is rotated by the intermediate gearing the sets of friction-plates on its surface engage the friction-wheels J' J², and through the speed-up gearing cause the threaded rod to be rapidly rotated alternately in opposite directions with greater or less intermediate periods of rest, thus causing the belt-shifting bars to travel along the rod in accordance with this rotation and move the belts from one end of the cone-pulley C', $a'$, and G to the other, increasing and decreasing their speed of rotation with intermediate periods of constant speed. These pulleys are so arranged on their respective cylinders that for an increase of speed of C' and G that of $a'$, which is tapered in the opposite direction, is decreased for the reason hereinafter stated. The threaded sleeves $k\ k'\ k^2$ are preferably made in two parts, and upon each of these bears a set-screw M', passing through the belt-shifting bar. If it be desired that any of the belts shall remain stationary in its movement along the surface of its cone-pulley, maintaining the speed of rotation of one or more parts constant while the others are varied, the set-screws are loosened, thus allowing the sleeves to turn freely in the bars and preventing their travel along the threaded rod. At the same time set-screws $M^2$ in the sleeves $l$ are tightened to engage the rods $l'$, thus insuring the belt-shifting bars remaining stationary. The rod $K'$ also carries another threaded sleeve $m$, upon which is mounted a bar $m'$, extending in one direction only and supported at its outer end by a sleeve $l$, similar to the others. To this bar is secured a rod $m^2$, to which is pivoted a connecting-rod N, pivotally connected at its opposite end to the end of a lever $N'$ on the stem of the clear-liquid-impact valve $N^2$ in the pipe $d'$. The bar $m'$ being caused to travel back and forth by the rotation of the rod $K'$ within its threaded sleeve causes the valve $N^2$ to be alternately opened and closed by the interposed rods and levers. It may be thrown out of action if desired by an arrangement precisely similar to that of the belt-shifting bars.

In the pipe $d'$ beyond the valve $N^2$ is another valve $n$ of the straightway type, having upon its upwardly-extending stem a belt wheel or pulley $n'$, which is rotated by means of a belt $n^2$ passing over a pulley $n^3$ near the end of rod $K'$. The sizes of these pulleys may be so proportioned that during the period in which the valve $N^2$ is opened the valve $n'$ will be opened and closed a number of times, imparting a pulsatory action to the jets of liquid issuing from the pipes $d$, increasing the effect of their impact force. It is not always essential or desirable in carrying out the process herein described to apply the impact-jets in a pulsatory manner, but will depend upon the grade of material under treatment and various other conditions. When the valve $n'$ is not in use, the belt $n^2$ is to be removed from its pulleys and the valve is left open. The rod $K'$ also has secured thereto a cylinder O, having in its surface a continuous cam-groove $O'$, into which extends the end of the lever $E^2$, previously described. The rotation of this groove imparts to the end of said lever a reciprocating movement, causing the longitudinal movement of the inner cylinder by the engagement of its opposite forked extremity therewith.

Upon the opposite surface of the gear $h'$ from that which carries the friction-plates are, preferably, three sets of two adjustable fingers P P', which are secured to the face of the gear by set-screws passing through slots $P^2$ in an enlarged portion $P^3$, the slots permitting an adjustment of the fingers circumferentially of the gear $h'$. The finger P' lies in the same plane as its enlarged portion and projects close to the face of the gear, while the finger P' is bent twice nearly at right angles, which causes it to project in a plane at a slight distance from the surface. It also has a greater radial length. These fingers respectively engage the ends of levers $p\,p'$, the former being a simple lever pivoted at its center upon a standard mounted on the bedplate, while the lever P' is compound, its two sections being mounted upon two similar standards. The opposite ends of these levers contact with the lower and upper sides, respectively, of a lever $p^2$, extending at right angles from the end of the stem of the material-feeding valve Q in pipe $D'$. The opposite extremity of the valve-stem carries a lever $Q'$, the lower end of which projects through a slot in the end of a lever $Q^2$, fixed to the stem of the liquid-valve $q$ in a pipe $q'$, communicating with the pipe $D'$ at a point between valve Q and the treatment vessel.

To the outer extremity of the lever $p^2$ is pivoted a rod R, connected to one member of a bell-crank lever $R'$, pivoted to the bed-plate, to the other arm of which is pivotally attached a long connecting-rod $R^2$, leading to the upper extremity of a lever $r$, to which it is attached by a bolt passing through a slot $r'$. The lower end of the lever $r$ is secured to a rod $r^2$, having a socket $I^3$ at its opposite end, in which is secured by means of a set-screw the stem of the discharge-valve $f$. By changing the point of attachment of the lever $r$ to the rod $r^2$ and by turning the valve-stem in its socket the extent of movement of the valve $f$ may be adjusted and its relative time of action to the other elements varied. A weight $r^4$ near the upper end of the lever $r$ assists in throwing said lever in one direction or the other.

As the levers $p\,p'$ are moved downward by the contact of the fingers P P' they respectively raise and lower the lever $p^2$, thus opening and closing the valve Q with intermediate periods during which it is stationary. This lever $p^2$ carries upon its upper and lower surfaces small pins S, which serve to prevent the slipping of levers $p\,p'$ as they engage it. As the valve Q is actuated it also in turn opens and closes the liquid-valve $q$ through the intervention of the levers $Q'\,Q^2$, at the same time the discharge-valve $f$ is operated by the bell-crank lever and its connecting-rods and levers.

The operation of the device is as follows: The valve Q being opened to its fullest extent, ore in a finely-divided state and mingled with a liquid, preferably water, is fed into the treatment vessel, which is being rotated at a speed sufficient to develop the desired degree of centrifugal force, in sufficient quantities to fill the channel or passage between the inner impact-cylinder and the separating-surface. Here the centrifugal force causes the material to move toward a position around the circumference of the vessel and the heavier to lodge upon the separating-surface. At the same time the material in suspension in the liquid and the surface of the accumulated material are subjected to opposing forces of preferably approximately constant degree in the form of the impact of the jets of liquid issuing from the orifices in the surface of the inner cylinder, the liquid-valve $N^2$ being partially open, and to the action of the moving tubes themselves, which produces an agitation in the material, permitting the heavier portion to be precipitated and causing the lighter to be suspended in the liquid and moved along toward the outlet by its impellent force, largely or wholly without frictional contact with the separating-surface. The separation is further aided by the vibration imparted to the treatment vessel by the recessed pulley G. It will not be found necessary under all conditions, however, to employ all of the above-mentioned opposing forces, and they may be used separately or conjointly and of a greater or less degree of intensity, as may best be adapted to the conditions or material under consideration. It will be understood that the more violent the agitation with relation to the centrifugal force during the separating period the heavier will be portions of material discharged during such period, and vice versa. The separation being accomplished, the valves and gearing are in the position shown in the drawings, and heavier material is now to be automatically discharged. The group I of friction-plates in its upward movement, as shown in Fig. 5, engages the friction-wheel $J'$ and causes it to rotate through the intermediate gearing, the longitudinal threaded rod thus moving the threaded sleeves and the bars which they support, shifting the belts to the opposite ends of the cone-pulleys and opening wide the liquid-impact valve $N^2$. At the same time the finger P strikes the end of lever $p$, which by means of the system of levers already described closes the material-valve Q, opens the clear-liquid valve $q$, and shifts the position of the discharge-valve $f$. As a result of these changes the supply of material is shut off from the feed end of the treatment vessel, the speed of rotation of said vessel is decreased, causing the heavier substances to be held less forcibly against the separating-surface and permitting them to be dislodged by the increased impact of the jets of liquid, the greater impellent force of its blow, and the increased agitation due to the more rapid movement of the tubes. The heavier material is thus carried out of the treatment vessel and into the pipe $F^2$, which conveys it to a separate receptacle. This position of parts and constant degrees of forces for discharge are maintained until the group $I'$ of friction-plates, in its downward movement, engages the friction-roll $J^2$, causing the opposite rotation of the rod $K'$, which, with the striking of the finger $P'$ against the lever $p'$, restores the elements to their former condition, and the period of separation follows.

When a separating vessel or cylinder is used of sufficiently large diameter to permit an accumulation or head of liquid at the receiving end to secure by the centrifugal force generated therein the force of flow through the same, the packing-boxes are preferably dispensed with.

By means of adjustments and changes in the various parts of the mechanism the length and frequency of the periods of operation of the elements, the intensity of the applied forces, and their relation one to the other may be varied within the desired limits.

By suitably arranging the speed-gearing $H'$ in the usual manner the relative speed of rotation of the counter-shaft and the longitudinal threaded rod may be changed, thus varying, relatively, the rate of speed of rotation of the pulleys $C'$, $a'$, and G and the rate of change in said speed, and consequently between the intensity of centrifugal force, agitation, and vibration and the change in said intensity. This adjustment also changes the frequency with which the fingers strike the valve-actuating levers, altering the frequency and length of the periods during which material and liquid are fed to the treatment vessel irrespective of the speed of rotation of the counter-shaft. The relation of these may be further controlled by the circumferential movement of the fingers on the face of the disk, while the time and extent of movement of the discharge-valve may be independently adjusted by the point at which its lever is attached to the connecting-rod, and the movement of its valve-stem in the connecting-socket.

The adjustment of the contact-surfaces $I I' I^2$ and the friction-wheels engaging therewith furnish a means for changing the intensity and time of application of these forces—centrifugal, agitation, and vibration—collectively, to vary the periods of separation and removal. If, for example, it is desired to gradually change the speed of rotation of the separating-surface, inner impact-cylinder, and vibrating pulley during the period of separation, say an increase thereof, and then almost immediately decrease them to the initial point during the period of removal of heavier substances, the contact-surfaces may be sufficiently increased by adding the removable plates and the friction-wheels moved well in toward the center of the gear $h'$. As a result one or the other of the wheels will be in frictional engagement with the contact-surfaces a greater part of the time, actuating the belt-shifters almost continuously alternately in opposite directions, effecting the required change; or, if it is desired to maintain the speed of rotation of these parts approximately constant during the periods of separation and removal, but of different rates, plates are removed from each of the contact-surfaces and the friction-wheels moved toward the periphery of the gear, giving substantially the arrangement illustrated in the drawings, when the wheels will be alternately engaged and oppositely rotated with intermediate periods of rest, thus quickly shifting the belt to the one end of the actuating cone-pulleys and rotating the parts at a constant rate for separation and then to the other ends thereof, varying the speed to the required amount for discharge, and maintaining them there until the cycle of operations recommences.

By setting any one of the belt-shifting bars along the threaded rod the timing of the movements of the parts it actuates will be changed with respect to its fellows. The rotation of any one pulley may be maintained constant by throwing out of action and fixing its belt-shifting bar, or any one of the pairs of pulleys may be removed and others of different size substituted, or the pulleys reversed in position on the shaft, thus making the change in its speed of rotation opposite to the others. The setting of the bar $m'$ on the rod $K'$ adjusts the periods of action of the impact-valve, and by putting pulleys of different diameters in place of those on the rod and on the stem of valve $n$ the speed of rotation of said valve, and consequently the number of pulsations of impact-jets of liquid delivered upon the separating-surface during the time that valve $n^2$ is open, may also be varied as desired, increasing or decreasing the agitating effect.

In the form illustrated in Figs. 12 to 15, inclusive, the rotatable separating vessel $S'$ is of conical form and has a series of peripheral orifices $S^3$ discharging into the hood F. The inner impact-shaft or deflector $S^2$ is also conical, preferably of about the same taper as the separating vessel, and has over its surface the impact-orifices $s$. This inner shaft is preferably supported by two long hollow trunnions $s'$ $s^2$, suitably journaled in standards to permit rotation by means of a pulley T at a different rate of speed from the separating vessel, preferably faster, and also a movement of longitudinal reciprocation by means of the mechanism which will now be described.

Below the outer extremity of the trunnion $s^2$ is fixed to the bed-plate a table $T'$, having upon its upper surface a sliding plate $T^2$ moving between suitable guideways. Upon this plate is located a block $t$, mounted to slide in guideways thereon. This block carries at its top a journal having a projecting bushing $t'$, which engages an annular groove $t^2$ in the outer surface of trunnion $s^2$. At the end of the plate $T^2$ is rigidly secured a block U, in which is journaled a crank-shaft $U'$, rotated by a pulley $U^2$ from any source of power. A connecting-rod $u$ extends from the cranked portion of said shaft to the sliding block $t$, to which it is pivotally connected. The plate $T^2$ is given a motion of slow reciprocation by means of a gear $u'$, mounted on a transverse shaft $u^2$, journaled in the table, which meshes with a rack V on the bottom of said plate. The shaft $u^2$ is rotated by a worm-wheel $V'$, which engages a worm $V^2$ upon a shaft $v$, extending longitudinally beneath the table and journaled therein. This shaft has at its outer extremity two tight pulleys $v$ and $v^2$ and between them a loose pulley $v^3$. Upon these pulleys are an open belt W and a crossed belt $W'$, which extend to similar pulleys on a counter-shaft. These belts are engaged by three pins $W^2$ upon a belt-shifting rod $w$, mounted to reciprocate in brackets on the table. Upon this rod are lugs $w'$ $w'$, which contact with a rod $w^2$, fixed to the plate $T^2$. Upon the upper surface of the rod $w$ are two lugs $w^3$, between which projects the end of a lever X, pivoted at its center to an upright on the table and weighted at its upper extremity $X'$. Between the pivot and the weight is a slot $X^2$ in an enlargement, through which projects a pin fixed in the upper end of the upright.

In operation the block $t$ is given a movement of comparatively short rapid reciprocation by the rotation of the crank-shaft $U'$, making the inner impact-shaft travel in the same manner longitudinally of its axis of rotation and transversely to the path of rotation of the separating-surface, causing, with the differential speed of rotation of the two, the impact-jets of liquid from orifices $s$ to play over, preferably, the entire surface. At the same time the rotation of the shaft $v$ by the belt W on the tight pulley $v'$ causes, through the intervention of the gearing, the comparatively slow travel of the plate $T^2$, carrying with it both the fixed and sliding blocks, resulting in a similar longitudinal movement of the impact-cylinder. This continues until the bar $w^2$ strikes the opposite lug $w'$, actuating the belt-shifting bar and moving the belts W $W'$ on the surface of the pulleys. The travel of the bar $w$ also causes the lugs $w^3$ to tilt, the weighted lever resulting in its falling to its other limit of motion—that is, until arrested by the pin striking the end of slot $x^2$ and carrying the belts by the dead-point, when each are equally on a fast and loose pulley. This places the crossed belt $W'$ on the pulley $v^2$ and rotates the shaft $v$ in the opposite direction, thus changing the direction of travel of the impact-shaft.

The separating vessel has a cylindrical portion $x$ beyond the discharge-orifices to permit the reciprocation of the inner shaft, and the pipe $D'$ and $d'$ extend sufficiently through their stuffing-boxes for the same purpose.

As shown in Fig. 12, the conical impact-shaft or deflector is about at its extreme point of travel into the separating vessel and the period of separation is about to begin. As heavier material accumulates on the separating-surface the shaft is moved gradually to the right, thus carrying its exterior away from the separating-surface and widening the channel or passage between them. As a result the distance between the surface of the impact-shaft and the surface of the accumulated heavier substance is kept approximately constant by this gradual movement, maintaining an approximately constant ratio between the force of aqueous impact from the orifices and the impellent force of the liquid carrying or moving lighter substances flowing through the channel. This continues until the end of its outward movement is reached, when its direction of travel is reversed, causing the surfaces to gradually approach one another, increasing both the aqueous impact and impellent forces, thus dislodging the accumulated heavier material and discharging it separately. At all times the short and rapid reciprocation is occurring to evenly distribute the field of action of the impact-jets. At the same time this rapid motion produces a series of slight contractions and enlargements in the size of the channel, causing a wash or series of waves which assist in separating lighter material and suspending it in the liquid in a manner somewhat similar to that of a jig.

The mechanism for automatically actuating the feed, impact, and discharge valves, and varying the applied forces by different speeds of rotation, already described in connection with the other figures, may be likewise employed here, and has therefore not been illustrated.

The phrases "aqueous impact force," "aqueous impellent force," and similar expressions have been used throughout to distinguish between the cause, action, and result of the agitating effect of impact of the molecules of a liquid, not, however, necessarily water, and that of the motive or propelling effect of a flowing liquid.

Although the terms "cylindrical" and "conical" have been applied throughout to the separating vessel and the inner impact-shaft or deflector for the sake of brevity, these forms are not absolutely essential to the operation of the machine, and any other might be employed by which the desired result would be obtained. It is to be understood that the word is used in this generic sense in both description and claims.

The phrase "constant impact force during the period of separation" and others similar thereto have been used, and it will be seen that when, during the periods of separation and discharge, the impact-jets are pulsatory in character their maximum and minimum effect will be controlled by the lever-actuated valve $N^2$, and will therefore be constant for such period, making their mean effect also constant. It will be noticed that while the aqueous and other forces opposing centrifugal force permit or allow the precipitation of heavier substances they cause or effect— that is, compel—the suspension of the lighter in the liquid, whereas the centrifugal force acts positively to effect both results. This explanation is made because it was not always possible to bring out the distinction clearly in the claims without prolixity when mentioning these forces in connection.

It is obvious that many changes and modifications in the details of construction of the various parts of the mechanism herein described may be made as desired by the constructor, or to best suit with the varied conditions under which the machine is operated, without departing from my invention.

In my applications, Serial Nos. 505,410, 505,411, and 505,418, filed March 28, 1894, I claim certain features shown and described but not claimed herein.

What I claim as my invention, and desire to secure by Letters Patent, is—

1. In a centrifugal separator, the combination of a rotatable separating-surface upon which material is in a submerged state, a hollow, rotatable deflector or cylinder in proximity thereto, orifices in said deflector for securing jets of liquid over that portion of the surface where separation is being effected, and automatic means for varying the force of the jets, substantially as described.

2. In a centrifugal separator, the combination of a rotatable separating-surface upon which material is in a submerged state, a hollow, rotatable deflector or cylinder in proximity thereto, orifices in said deflector for securing jets of liquid over that portion of the surface where separation is being effected, and means for increasing the force of the jets whereby accumulated heavier substances are discharged, substantially as described.

3. In a centrifugal separator, the combination of a rotatable separating-surface upon which material is in a submerged state, a hollow, rotatable deflector or cylinder in proximity thereto, orifices in said deflector for securing jets of liquid over that portion of the surface where separation is being effected, and automatic means for increasing the force of the jets whereby accumulated heavier substances are discharged, substantially as described.

4. In a centrifugal separator, the combination of a rotatable separating-surface upon which material is in a submerged state, a hollow, rotatable deflector or cylinder in proximity thereto, orifices in said deflector for securing jets of liquid over that portion of the surface where separation is being effected, a pipe or conduit delivering to the interior of the deflector, a valve in said pipe, and automatic means for operating the same to produce variations in the force of the jets, substantially as described.

5. In a centrifugal separator, the combination of a rotatable separating-surface, and means for causing the suspension of lighter substances by securing jets of liquid of alternately increasing and decreasing force over that portion of the surface where separation is being effected, the pulsations occurring continuously throughout the periods of separation and discharge of heavier substances, substantially as described.

6. In a centrifugal separator, the combination of a rotatable separating-surface, means for causing the suspension of lighter substances by securing jets of liquid of alternately increasing and decreasing force over that portion of the surface where separation is being effected, the pulsations occurring continuously throughout the periods of separation and discharge of heavier substances, and means for varying the period of such pulsations, substantially as described.

7. In a centrifugal separator, the combination of a rotatable separating-surface, a hollow deflector or cylinder in proximity thereto provided with orifices over the separating-surface, a pipe or conduit delivering to the interior of said deflector, and a valve rotated in said pipe and adapted to be continuously rotated, substantially as described.

8. In a centrifugal separator, the combination of a rotatable separating-surface, and a cylinder or deflector in proximity thereto, the two being relatively, gradually movable in a direction transverse to the path of rotation, and at the same time quickly movable back and forth to a less extent in the same direction, substantially as described.

9. In a centrifugal separator, the combination of a rotatable separating-surface, a cylinder or deflector in proximity thereto, the two being relatively, gradually movable in a direction transverse to the path of rotation, and at the same time quickly movable back and forth to a less extent in the same direction, and automatic means for effecting such movements, substantially as described.

10. In a centrifugal separator, the combination of a rotatable separating-surface, and means for effecting an agitation of material by securing jets of liquid over said surface, the two being relatively, gradually movable in a direction transverse to the path of rotation, and at the same time quickly movable back and forth to a less extent in the same direction, substantially as described.

11. In a centrifugal separator, the combination of a rotatable separating-surface, and means for effecting an agitation of material by securing jets of liquid over said surface, the two being relatively, gradually movable in a direction transverse to the path of rotation, and at the same time quickly movable back and forth to a less extent in the same direction, and automatic means for effecting such movements, substantially as described.

12. In a centrifugal separator, the combination of a rotatable separating-surface, and means for effecting an agitation of material by securing jets of liquid over said surface, gradually movable in a direction transverse to the path of rotation, and at the same time more quickly movable back and forth to a less extent in the same direction, substantially as described.

13. In a centrifugal separator, the combination of a rotatable, conical separating-surface, a conical shaft provided with jet-orifices forming therewith a channel or passage adapted to be filled with liquid in operation, and means for moving said shaft longitudinally on its axis, substantially as described.

14. In a centrifugal separator, the combination of a rotatable, conical separating-surface, a conical shaft provided with jet-orifices forming therewith a channel or passage adapted to be filled with liquid in operation, and automatic means for moving the said shaft longitudinally on its axis, substantially as described.

15. In a centrifugal separator, the combination of a conical separating vessel, and an inner, conical shaft or deflector delivering liquid jets over the separating-surface, and forming therewith an intermediate channel or passage, the two relatively movable in such a manner as to enlarge said channel during the separating period and decrease it during the removing period, substantially as described.

16. In a centrifugal separator, the combination of a conical separating vessel, and an inner, conical shaft or deflector delivering liquid jets over the separating-surface, and forming therewith an intermediate channel or passage, the two relatively movable in such a manner as to enlarge said channel during the separating period and decrease it during the removing period, and automatic means for accomplishing this movement, substantially as described.

17. In a centrifugal separator, the combination of a conical separating vessel, and an inner conical shaft or deflector forming therewith an intermediate channel or passage, the two being gradually relatively movable in such a manner as to enlarge said channel during the separating period and decrease it during the removing period, and means for securing at the same time a shorter, quicker movement thereof substantially as described.

18. In a centrifugal separator, the combination of a conical separating vessel, and an inner conical shaft or deflector forming therewith an intermediate channel or passage, the two gradually, relatively movable in such a manner as to enlarge said channel during the separating period and decrease it during the removing period, means for securing at the same time a shorter, quicker movement thereof, and automatic means for effecting such movements, substantially as described.

19. In a centrifugal separator, the combination of a rotatable separating-surface, means for effecting an agitation of material by securing jets of liquid over said surface, gradually movable toward and from the same, and automatic means for accomplishing such movements, substantially as described.

20. In a centrifugal separator, the combination of a rotatable separating-surface, and means for effecting an agitation of material by securing jets of liquid over said surface, movable from the same during the separating period to allow the suspension of the lighter substances, and toward it thereafter to aid in the discharge of heavier substances, substantially as described.

21. In a centrifugal separator, the combination of a rotatable separating-surface, and means for effecting an agitation of material by securing jets of liquid over said surface, gradually movable from the same during the separating period to allow the suspension of the lighter substances, and toward it thereafter to aid in the discharge of heavier substances, and automatic means for accomplishing this movement, substantially as described.

22. In a centrifugal separator, the combination of a rotatable separating-surface, means for separating lighter substances by securing jets of liquid over such surface and for effecting the removal of the heavier by increasing the force of said jets, and means for varying the length and frequency of the periods of separation and removal by changing the time of application of the jets, substantially as described.

23. In a centrifugal separator, the combination of a rotatable separating-surface upon which the material is in a submerged state, a deflector or cylinder in proximity thereto, forming a channel or passage adapted to be filled with liquid in operation and means for producing a wave motion or wash in opposite directions in said channel by rapidly varying the size thereof, substantially as described.

24. In a centrifugal separator, the combination of a rotatable separating-surface upon which the material is in a submerged state, a deflector or cylinder in proximity thereto, forming a channel or passage adapted to be filled with liquid in operation and automatic means for producing a wave motion or wash in opposite directions in said channel by rapidly varying the size thereof, substantially as described.

25. In a centrifugal separator, the combination of a rotatable conical vessel, a conical deflector therein, forming a channel or passage adapted to be filled with liquid in operation and means for producing a wave motion or wash in opposite directions in said channel by imparting to one a rapid reciprocation, substantially as described.

26. In a centrifugal separator, the combination of a rotatable conical vessel, a rotatable conical deflector therein, forming a channel or passage adapted to be filled with liquid in operation and means for producing a wave motion or wash in opposite directions in said channel by imparting to one a rapid reciprocation, substantially as described.

27. In a centrifugal separator, the combination of a rotatable conical vessel, a conical deflector therein, forming a channel or passage adapted to be filled with liquid in operation and means for producing a wave motion or wash in opposite directions in said channel by imparting to said deflector a rapid reciprocation, substantially as described.

28. In a centrifugal separator, the combination of a rotatable separating-surface, means for securing aqueous impact force to effect agitation of material thereon, valves for controlling this force, a reciprocating lever for operating said valves, and projections secured near the periphery of a rotary wheel for moving the levers, substantially as described.

29. In a centrifugal separator, the combination of a rotatable separating-surface, means for securing aqueous impact force to effect agitation of material thereon, valves for controlling this force, a lever for operating said valves connected to a reciprocating threaded sleeve, and a rotatable threaded rod for actuating said sleeves, substantially as described.

30. In a centrifugal separator, the combination of a rotatable separating-surface, a supply pipe or conduit for securing an aqueous impact force to effect agitation of material thereon, and a continuously rotary valve in the pipe or conduit to cause pulsations in said force, substantially as described.

31. In a centrifugal separator, the combination of a rotatable separating-surface, means for securing aqueous impact force to effect agitation of material thereon, valves for controlling this force, a reciprocating lever for operating said valve, and adjustable revolving projections for actuating the lever, substantially as described.

32. In a centrifugal separator, the combination of a rotatable separating-surface, means for securing aqueous impact force to effect the agitation of material thereon, a valve for controlling this force, a reciprocating lever operating said valve connected to a threaded sleeve, a rotatable threaded rod for actuating said sleeve, and a second similar sleeve upon said rod actuating belt-shifting mechanism to vary the speed of rotation in the separating-surface, substantially as described.

ORRIN B. PECK.

Witnesses:
M. L. ALLEN,
R. H. GARMAN.

It is hereby certified that Letters Patent No. 560,623, granted May 19, 1896, upon the application of Orrin B. Peck, of Chicago, Illinois, for an improvement in "Centrifugal Separators," were erroneously issued to Melinda Peck as sole owner of the invention; whereas said Letters Patent should have been issued to *The Patent Title Company, of same place,* said The Patent Title Company being assignee, by mesne assignments, of the entire interest in said invention, as shown by the assignments of record in this Office; and that the said Letters Patent should be read with this correction therein that the same may conform to the record of the case in the Patent Office.

Signed, countersigned, and sealed this 23d day of June, A. D. 1896.

[SEAL.]

JNO. M. REYNOLDS,
*Assistant Secretary of the Interior.*

Countersigned:
S. T. FISHER,
*Acting Commissioner of Patents.*